United States Patent
Riley et al.

(10) Patent No.: US 10,299,498 B2
(45) Date of Patent: *May 28, 2019

(54) METHOD FOR PRODUCING SURIMI WITH REDUCED LOSS OF MYOFIBRILLAR PROTEIN

(71) Applicant: Trident Seafoods Corporation, Seattle, WA (US)

(72) Inventors: Christopher Campbell Riley, Federal Way, WA (US); Mette Kristina Joensen, Vedbaek (DK)

(73) Assignee: Trident Seafoods Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,767

(22) Filed: Apr. 27, 2018

(65) Prior Publication Data

US 2018/0242618 A1   Aug. 30, 2018

Related U.S. Application Data

(63) Continuation of application No. 14/670,145, filed on Mar. 26, 2015, now Pat. No. 9,955,709.
(Continued)

(51) Int. Cl.
*A23L 5/00* (2016.01)
*A23L 17/00* (2016.01)

(52) U.S. Cl.
CPC .................. *A23L 5/57* (2016.08); *A23L 17/00* (2016.08); *A23L 17/70* (2016.08)

(58) Field of Classification Search
CPC ............. A23L 5/57; A23L 17/00; A23L 17/70
See application file for complete search history.

(56) References Cited

U.S. PATENT DOCUMENTS

| 2,402,099 A | 6/1946 | Toft |
| 4,060,644 A | 11/1977 | Braid |
| (Continued) | | |

FOREIGN PATENT DOCUMENTS

| CN | 101 664 208 A | 3/2010 |
| CN | 101 744 317 A | 6/2010 |
| (Continued) | | |

OTHER PUBLICATIONS

International Preliminary Report on Patentability and Written Opinion dated Sep. 27, 2016, issued in corresponding PCT/EP2015/056608, filed Mar. 26, 2015, 7 pages.
(Continued)

*Primary Examiner* — Anthony J Weier
(74) *Attorney, Agent, or Firm* — Christensen O'Connor Johnson Kindness PLLC

(57) ABSTRACT

A method for washing fish flesh to remove water soluble sarcoplasmic proteins includes producing a mixture by combining wash water with fish flesh having sarcoplasmic and myofibrillar proteins, wherein the wash water removes some of the sarcoplasmic protein from the fish flesh; depositing the mixture on a screen separator. The wash water having sarcoplasmic proteins is separated from the mixture while a speed of the screen separator and a speed of the mixture at the interface with the screen separator remains about equal and reducing or eliminating shear forces at the interface between the screen separator and the fish flesh. Thus, washed fish flesh fish flesh with an increase in a percent of myofibrillar protein retained in the fish flesh is produced. In order to have a speed of the screen separator belt be equal with a speed of the mixture at the interface, the perforated screen separator is stationary, vibrating only in the up and down direction, advancing slowly or fast, or advancing only
(Continued)

intermittently, while the wash water is allowed to percolate through the fish flesh and exit the perforated screen.

18 Claims, 3 Drawing Sheets

Related U.S. Application Data

(60) Provisional application No. 61/970,791, filed on Mar. 26, 2014.

(56) References Cited

U.S. PATENT DOCUMENTS

| | | | |
|---|---|---|---|
| 5,223,301 A | 6/1993 | Kanda et al. | |
| 5,332,593 A | 7/1994 | Goto et al. | |

FOREIGN PATENT DOCUMENTS

| | | |
|---|---|---|
| DK | 2016 70839 A1 | 10/2016 |
| GB | 241169 A | 11/1926 |
| GB | 1032932 A | 6/1966 |
| JP | 2000-228942 A | 8/2000 |
| WO | 87/00733 A1 | 2/1987 |
| WO | 2015/144839 A1 | 10/2015 |

OTHER PUBLICATIONS

International Search Report dated Jun. 17, 2015, issued in corresponding PCT/EP2015/056608, filed Mar. 26, 2015, 4 pages.

METHOD FOR PRODUCING SURIMI WITH REDUCED LOSS OF MYOFIBRILLAR PROTEIN

CROSS-REFERENCE TO RELATED APPLICATION

This application is a continuation of application Ser. No. 14/670,145, filed Mar. 26, 2015 (now U.S. Pat. No. 9,955, 709), which in turn claims the benefit of Provisional Patent Application No. 61/970,791, filed Mar. 26, 2014, the contents of both of which applications are incorporated herein by reference.

BACKGROUND

Surimi is produced by widely varying processes, but nearly all processes include certain basic steps, usually in the following order: deboning, gutting, skinning, and filleting the fish, mincing the fish flesh, washing the fish flesh with water, separating the wash water from the fish flesh, refining the fish flesh to remove impurities and connective tissue, dewatering the fish flesh, blending the fish flesh with cryoprotectants, and freezing the fish flesh. It is to be appreciated that there are variations that can be employed. For example, the wash and separate steps may be performed a multitude of times, so too can the refining and dewatering steps. In the case where the surimi is expected to be used within a few days of production, the blending and freezing steps would not be necessary. It is also to be appreciated that surimi is an intermediate product. Surimi is used in making a variety of consumer end products such as kamaboko and artificial crabmeat. The major component of surimi is myofibrillar protein. The wash, separate, refine, and dewater steps are aimed at removing impurities in an effort to concentrate the more valuable, gel forming myofibrillar protein. Impurities such as blood, cartilage, connective tissue, skin, tendon, ligaments, and water-soluble sarcoplasmic proteins are removed in the wash, separate, and refining steps. The optimal water content can be achieved in the dewater step. An ongoing problem is the loss of the desirable myofibrillar protein with the wash water. The loss of myofibrillar proteins not only reduces the overall yield of surimi product, but the protein is often discarded with the wash water. If the wash water ends up in the ocean, the protein will add to the biochemical oxygen demand (BOD) and result in less dissolved oxygen in the ocean. Reduced oxygen levels in the ocean can lead to the death of aquatic life including fish. Because the myofibrillar proteins are both insoluble and denser than seawater, they sink to the ocean floor where they accumulate. The process of biological oxidation can kill the animals that make up the benthic community through oxygen deprivation.

SUMMARY

Methods for washing fish flesh to remove water soluble sarcoplasmic proteins and reduce the loss of myofibrillar proteins from the fish flesh, include producing a mixture by combining wash water with fish flesh having sarcoplasmic and myofibrillar proteins, wherein the wash water removes some of the sarcoplasmic proteins from the fish flesh; depositing the mixture on a screen separator, separating wash water having sarcoplasmic proteins from the mixture while a speed of the screen separator and a speed of the mixture at the interface with the screen separator remain about equal and reducing or eliminating shear forces at the interface between the screen separator and the fish flesh; and producing washed fish flesh with an increase in a percentage of myofibrillar protein retained in the fish flesh. The method allows the wash water with sarcoplasmic protein to pass first through an accumulation of previously dewatered minced fish and then through the screen.

In order to have a speed of the screen separator be equal with a speed of the mixture at the interface, the perforated screen separator belt is stationary, vibrating only in the up and down direction, advancing slowly or fast, or advancing only intermittently, while the wash water is allowed to percolate, and thus self-filter, through the fish flesh and exit the perforated screen.

In some embodiments, the percentage of myofibrillar protein retained is at least 80% by weight of the natural myofibrillar protein found in fish.

In some embodiments, a majority of the wash water is separated during a period when the speed of the screen separator and the speed of the mixture at the interface with the screen separator is about equal.

In some embodiments, the method further comprises maintaining the screen separator in a stationary position while the mixture is being deposited thereon.

In some embodiments, the method further comprises advancing the screen separator from the stationary position when a level of the mixture on the screen separator reaches a target in the stationary position.

In some embodiments, the method further comprises advancing the screen separator from the stationary position when a weight of the mixture on the screen separator reaches a target.

In some embodiments, the method further comprises advancing the screen separator from the stationary position when an elapsed time reaches a target.

In some embodiments, the method further comprises advancing the screen separator from the stationary position when a water content of the mixture reaches a target.

In some embodiments, the method further comprises advancing the screen separator from the stationary position when a level of pooled water reaches a target.

In some embodiments, the screen is not advancing in the horizontal direction in the stationary position.

In some embodiments, the method further comprises advancing the screen separator while the mixture is being deposited thereon.

In some embodiments, the method further comprises intermittently advancing and stopping the screen separator.

In some embodiments, the method further comprises continuously depositing the mixture on the screen separator, and creating separation of the mixture due to the intermittent advancing and stopping.

In some embodiments, the method further comprises vibrating the screen in the vertical direction.

In some embodiments, the method further comprises separating the wash water having sarcoplasmic protein from the fish flesh via the force of gravity alone.

In some embodiments, the method further comprises allowing water from the mixture to pass through the screen separator onto a second screen separator.

In some embodiments, the screen separator comprises a belt screen.

In some embodiments, the method further comprises refining the washed fish flesh to reduce impurities and connective tissue, followed by dewatering the fish flesh and collecting resulting water, and adding the water from the dewatering step to the mixture before or during depositing the mixture onto the screen separator.

In some embodiments, the method further comprises refining the washed fish flesh to reduce impurities and connective tissue, followed by dewatering the fish flesh and collecting resulting water with solids, and separating the resulting water and solids on a screen separator while reducing or eliminating shear forces at the interface between the screen and the solids.

In some embodiments, the method further comprises advancing the screen at an effective rate that reduces or eliminates shear force between at the interface of the screen separator and the fish flesh.

In some embodiments, the fish flesh is Alaska Pollock (*Theragra chalcogramma*), Pacific whiting (*Merluccius productus*), Atlantic cod (*Gadus morhua*), Pacific cod (*Gadus macrocephalus*), Croaker (*Pennahia macrocephalus*), Bigeye (*Priacanthus arenatus*), Tilapia (*Oreochromis mossambicus*), Southern Blue whiting (*Micromesistius australis*), Blue whiting (*Micromesistius poutassou*), Basa (*Pangasius bocourti*), Carp (*Cyprinidae* spp.), Hake or Cod (*Gadidae* spp.), Catfishes (order Siluriformes), Atlantic salmon (*Salmo salar*), Chinook salmon (*Oncorhynchus tshawytscha*), Chum salmon (*Oncorhynchus keta*), Coho salmon (*Oncorhynchus kisutch*), Pink salmon (*Oncorhynchus gorbuscha*), Sockeye salmon (*Oncorhynchus nerka*), any member of the Cyprinidae large family of freshwater fishes, including the carps.

Method for producing surimi can include any one of the various embodiments for washing fish flesh.

Methods for making surimi may include washing fish flesh according to any one of wash and separate methods disclosed herein.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
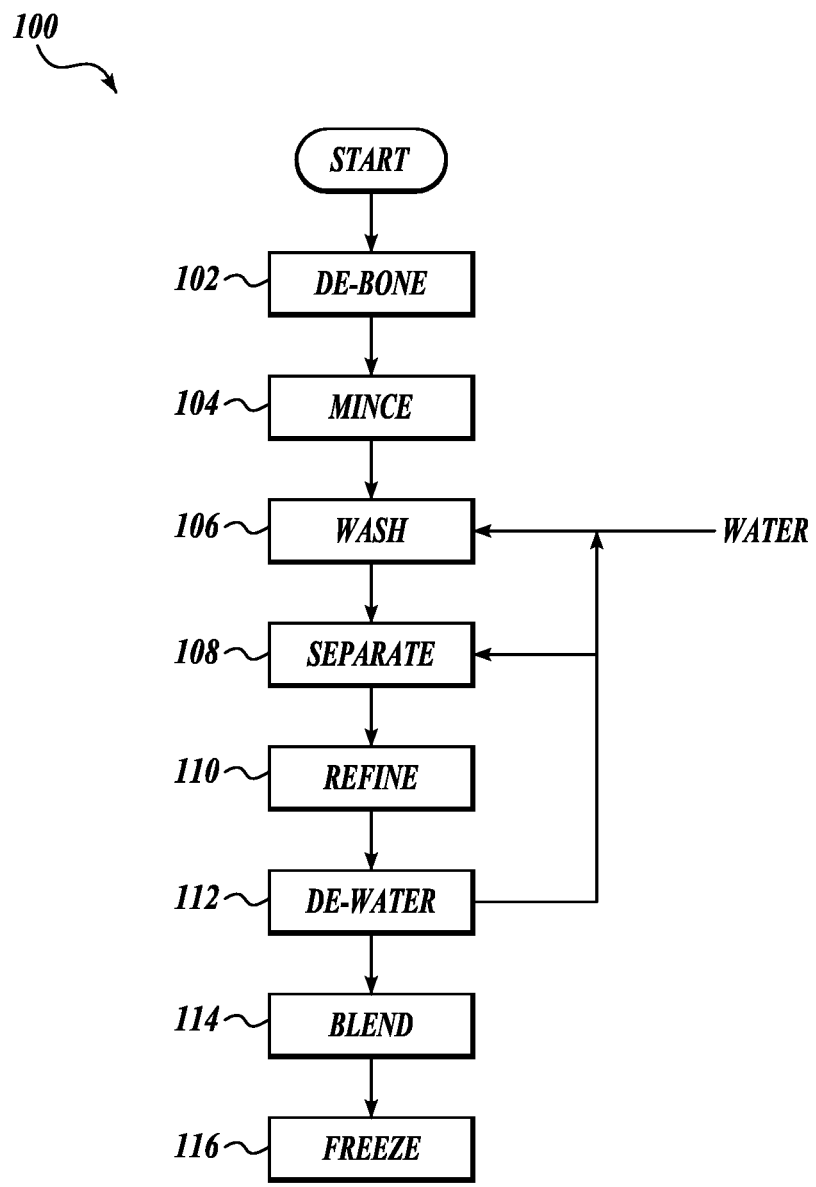
FIG. 1 is a generalized process of producing surimi in accordance with embodiments of the invention.

Referring to FIG. 1, an illustration of a basic surimi process is illustrated in accordance with embodiments of the invention. In making surimi, the fish is first de-headed, gutted, sometimes filleted, and deboned by using well-known machinery in block 102. After deboning and gutting, the fish flesh is minced in block 104 by well-known machinery, such as by forcing the fish flesh to pass through a perforated steel drum having holes in the range of from 2-7 mm in diameter, and usually from 3-5 mm, in diameter. Many variations of deboning and mincing fish flesh exist. The extent to which the fish is minced is oftentimes dictated by the quality of the surimi desired to be produced or by balancing the amount of fish flesh desired to be recovered versus the cost to recover it. In some operations, the raw material is composed of trimmings, frame meat, or muscle tissue contained in the fish head.

Generally, all surimi is produced by washing the fish flesh with water, block 106, and then separating the water, block 108. Washing the fish flesh with water is used to make surimi, because the wash step removes much of the undesirable water-soluble sarcoplasmic protein, enzymes, and blood, and concentrates the myofibrillar protein. Myofibrillar protein is more desirable because the myofibrillar protein produces the gel-forming ability characteristic of surimi, while the sarcoplasmic protein only detracts from this ability. Many variations of the wash and separate steps exist. In conventional wash processes, the wash water is combined with fish flesh in a batch, continuous batch, continuous tank, or "pipe" wash. Many times, the wash and separate steps are performed in the same machinery. For example, a perforated rotating drum spins around its central axis while the wash water is sprayed onto the outside of the drum and mixes with the tumbling fish flesh inside the tank. The spraying is stopped, and then the water is induced to separate from the fish flesh through perforations in the drum as the drum rotates. The amount of water, the temperature, and the time of the wash and separate steps can all be adjusted to produce surimi having selected characteristics, such as color and gel-forming ability.

It has now been discovered that separation of the wash water using a rotating drum can lead to excessive losses of myofibrillar protein in the wash water. Some of this water passes to the inside of the drum where it facilitates the removal of the small particles of principally myofibrillar protein that have been created by shearing at the slurry-screen interface. Internal shear and tensile stress is the result of the tumbling that is induced in the partially dewatered slurry by the shear force on the material supplied by the rotation of the drum. A method and an apparatus are described herein that substantially reduce the loss of myofibrillar protein in the wash water separate step. Further, the method has certain attendant advantages, such as enhancing the removal of blood, because of the gentle handling of the fish flesh during the separate step.

Figure 2:
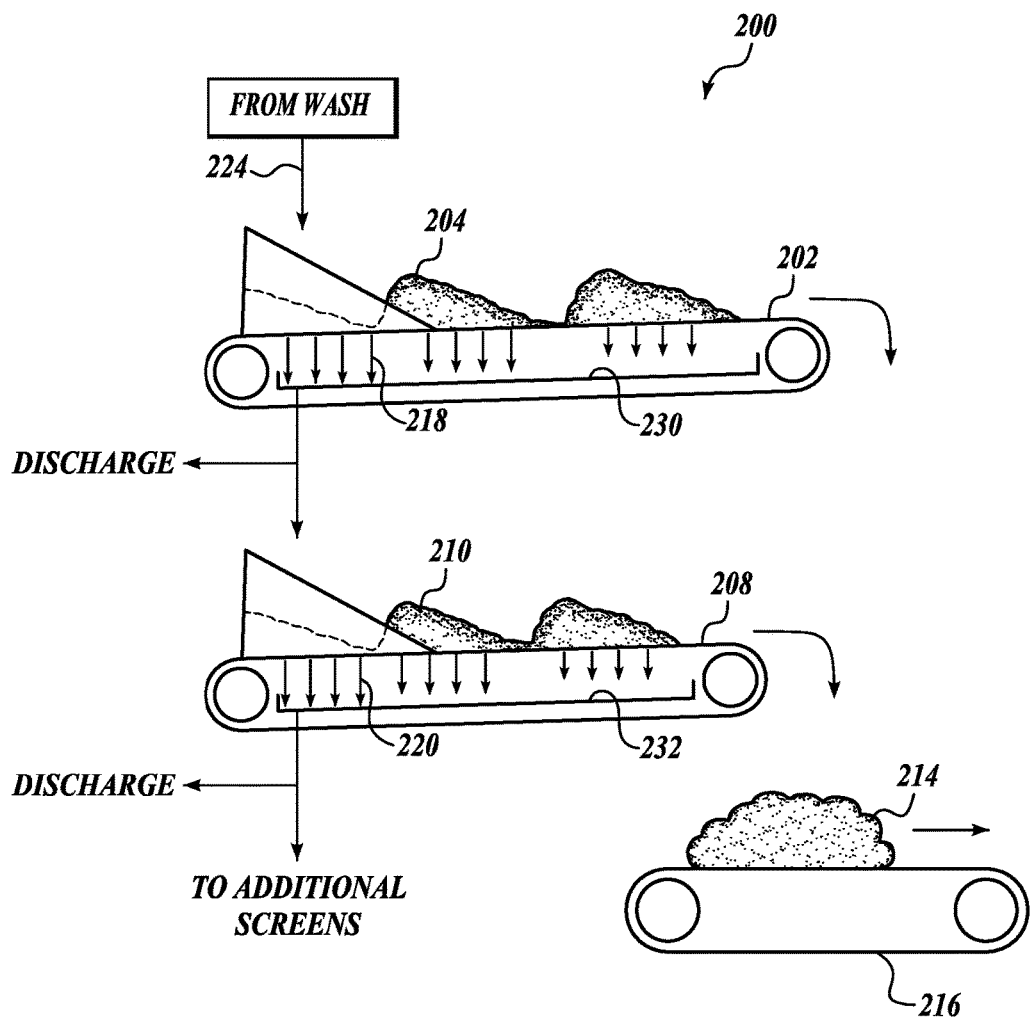
FIG. 2 is a schematic illustration of a wash water screen separator used in embodiments of the invention.

Referring to FIG. 2, an embodiment of a separator 200 that may be used in the separate step, block 108, is shown that may reduce the loss of myofibrillar protein to the wash water. Though the illustration is highly schematic, it is to be appreciated that the separator 200 may include additional components, such as framing members, motors, electrical components, and the like to carry out the functions as described herein. The separator 200 may include one or more perforated screens in a stacked orientation, i.e., two or more screens are directly positioned vertically so that the water will pass through the plurality of screens. In the embodiment illustrated, the separator 200 may include a first 202 and a second 208 separating screen conveyor. Each screen conveyor includes a perforated screen or belt arranged in an endless loop between two rollers. The belt screens 202 and 208 may include holes in the range of 15-10000 microns, with 100-3000 microns being useful. In some embodiments, the size of holes may be 10000, 9000, 8000, 7000, 6000, 5000, 4000, 3000, 2500, 2000, 1500, 1000, 900, 800, 700, 600, 500, 400, 300, 200, 100, 60, 30, or 15 microns, or any range that is derivable therefrom, such that any upper and lower range can be selected from 10000, 9000, 8000, 7000, 6000, 5000, 4000, 3000, 2500, 2000, 1500, 1000, 900, 800, 700, 600, 500, 400, 300, 200, 100, 60, 30, or 15 microns. The holes may take the form of several shapes including round, square, triangular, or any other regular or irregular shape. The perforated screens can be formed from a woven mesh of fabric, plastic, artificial or natural fibers. The useful size screen holes may be determined by experimenting with various sizes. Because of differences in processes or the type of fish, optimal screen hole sizes may vary between different processes, different ratios of wash water to fish, or different species of fish.

In embodiments of a separator having a plurality of screens, the screens may be placed horizontally side by side or stacked vertically one atop the other, wherein the adjacent and higher screen includes holes of a larger diameter than the lower screen. Where two or more screens are used, the separated wash water can cascade from screen to screen. Generally, any subsequent screen has holes smaller than the one preceding it. For example, screen 202 may have holes about 800 to 3000 microns in diameter, and the lower screen 208 may have holes about 100 microns to 500 microns. Holes can range up to or at least 1000 microns in diameter. The belt screens 202 and 208 may generally be flat, and, furthermore, the belt screens 202 and 208 may be flexible, such that the screens can be arranged in an endless loop engaged with a driver roller on one end and a follower roller at the opposite end, so that the screens can advance in one direction. Additionally, the screens 202 and 208 may be enclosed by side walls so as to contain material falling onto the top surface of the screen. In the illustrated embodiment, the screens can be placed at a slight angle such that the screens rise in the direction of travel. This can lead to pooling of water at the lower end of the screen. However, some embodiments may have the screens 202 and 208 lie perfectly horizontal, and in still other embodiments, the screens may decrease in elevation in the direction of travel. However, when the screens are inclined or declined, the angle is not so great as to cause movement between the top surface of the screen and the minced fish flesh resting thereon. Such movement or sliding on the top surface of the screen can cause shear forces that result in the undesirable loss of myofibrillar protein.

Directly beneath each of the screens 202 and 208, the separator includes a catch pan. Catch pan 230 can be placed directly beneath screen 202, and catch pan 232 can be placed directly beneath screen 208. The catch pans 230 and 232 catch the water and any material that falls through the respective screen. From the catch pan 230, the water and material can be discharged or the water and material can be deposited to a lower or alternate screen, such as screen 208, for further filtering. The water that separates from the lower screen 208 is caught by the catch pan 232. The water can then be pumped via a pump to a discharge point, or the water may be sent for treatment before being discharged into the ocean. Alternatively, the water can be directed to any number of additional screens (not shown) for continued filtering. For some species, such as Pacific whiting, it may be optimal to filter the material four or more times.

As discussed above, the separator 200 may replace the rotating drum that performed the wash and separate steps. If the separator 200 is used, an additional wash apparatus may be employed, such as a tank with or without a paddle mixer or agitator. Also, a closed coil of pipe that may include restrictions, elbows, or an inline static mixer to affect agitation may be employed. The mixer is preferably a low shear mixer. However, other wash apparatuses may also be used. Once the fish flesh is combined with the wash water and agitated in the wash tank, the mixture 224 of fish flesh and water may be deposited on the top screen 202 of the separator 200 to separate the wash water with the water soluble proteins from the fish flesh. The wash water can be sprayed or otherwise combined with the fish flesh before or during the time when the fish flesh 224 is deposited on the upper screen 202 of separator 200 as illustrated in FIG. 2.

It has been found that mechanical separators that cause shear forces between the surface of perforated screens and the fish flesh leads to loss of myofibrillar protein in the wash water. However, in the embodiments disclosed herein, a feature of the screen separators is to separate the wash water having sarcoplasmic proteins from the mixture while a speed of the screen separator and a speed of the mixture at the interface with the screen separator remains about equal and reduces or eliminates shear forces at the interface between the screen separator and the fish flesh. That is, there is little to no relative movement between the fish flesh and the screen surface during the separation of the wash water. Thus, when the screen is advancing, the fish flesh advances together, and when the screen is stopped, the fish flesh is also stopped. In order to have a speed of the screen separator belt be equal with a speed of the mixture at the interface with the screen surface during separation of the wash water, the perforated screen separator can be stationary, vibrating only in the up and down direction, advancing slowly, advancing fast, or advancing only intermittently when the fish flesh is being deposited on the screen. Therefore, a majority of the wash water can be separated when a speed of the screen separator and a speed of the mixture at the interface with the screen separator remain about equal, which reduces or eliminates shear forces at the interface between the screen separator and the fish flesh.

A result of the screen being stopped or stationary in the horizontal direction while the fish flesh is being deposited is that little or no shear forces are being generated. As is well known, a shear force is a force or forces that tend to move an object in two opposite directions, mainly caused by the inertia of any object to resist motion when an object with which the first object is in contact with is in motion, such as in the case of the rotating drum separator described above.

In some of the embodiments, in order to reduce the shear forces experienced by the minced fish flesh at the interface with the screen separator, the fish flesh 204 is deposited on a perforated screen 202 that is stationary or at rest at least in the horizontal direction so as to reduce or eliminate most of the shear force between the surface of the perforated screen and the fish flesh 204. That is, when stationary, the speed of the screen 202 is zero, the speed of the mixture at the screen interface when being deposited is for all intents and purposes also zero. When the screen 202 is not advancing, the mixture does not move with respect to the screen surface, and when the screen 202 is advancing, the mixture is advanced at the same speed. In both these instances, the speed of the screen matches the speed of the mixture at the interface.

The screen can remain stationary for a period of time during and sometimes after depositing the fish flesh 204 on the upper surface of the perforated screen 202. During this wait time while the perforated screen is stationary, the wash water may pass through the screen under the force of gravity alone. As the fish flesh 204 begins to accumulate on the surface of the screen, the wash water must pass through a greater height of fish flesh, thus reducing the amount of water that can be separated. Upon reaching a predetermined height, level, or elapsed time target, the screen 202 can advance forward, thus allowing an empty part of the screen 202 to be located in the path of the fish flesh denoted by arrow 224. Each time the screen stops and starts, a separate mound of fish flesh can be produced. The length of the screen 202 can be extended so that multiple mounds of fish flesh are formed on the same screen. Extending the length of the screen results in extending the filtering time, thus allowing the water to percolate through each separate mound. As shown, each mound has a correspondingly lower amount of water that is being separated the further advanced the mound is in relation to the newly deposited fish flesh. When the perforated screen 202 advances, a previously deposited fish flesh 204 mound will drop onto the conveyor 214 where the collected fish flesh 214 is carried on to the next step, such as refining or additional separators as described herein.

Screens 202 and 208 can advance a pre-set distance and then stop for a predetermined period. Instrumentation can also be used to determine when to stop or advance the screens. For example, in some embodiments, the screens are caused to advance when the fish flesh 204 and 210 reaches a pre-determined level or height target. Other embodiments may use instrumentation to measure the weight and determine when a weight target is deposited on the respective screen, and still other instrumentation may determine when an elapsed time target is reached in either the stopped position or the advancing position. Instrumentation may include a level sensor, conductivity sensor, capacitance sensor, pressure sensor, sonar, optical sensor, or any device capable of detecting the presence or absence of fish flesh at a given point.

While the separator 200 is for separating the wash water from the minced fish flesh without incurring loss of myofibrillar proteins as compared to conventional methods of separating the free water from minced fish flesh, the disclosed methods may also lead to enhanced removal of blood as compared to the conventional separators. In order to reduce the loss of myofibrillar proteins, the separator 200, in accordance with embodiments of the invention, creates little to no shear forces between the minced fish flesh and the surface of the screens 202, 208, during the separation of the wash water, and it does so by keeping a speed of the fish flesh mixture at the interface with the screen generally about equal to the speed of the screen. Even when the screen is advancing and the fish flesh mixture is being deposited, if the speed of the fish flesh on the surface or interface of the screen is kept about the same as the speed of the screen, the generation of shear forces is reduced. A way to detect whether shear forces are being created is by analysis of the fines in the effluent. The presence or absence and the amount of fines in the effluent can be used as a guide in determining the extent of shear forces that are present. Comparatively fewer fines indicate the reduction of shear forces.

In some embodiments, instead of stopping and advancing intermittently, the perforated screens 202 and 208 may be advancing at a slow or fast pace while the fish flesh is being deposited. However, when the screens 202 and 208 are advancing either slowly or fast, the speed of the fish flesh mixture is also advancing at about the same speed during separation of the wash water. This is to minimize or reduce the shear forces between the surface of the screen and the fish flesh mixture. Whether or not shear forces are occurring can be determined by the amount or lack of fines in the water being separated. Thus, the speed of advancing the screen can be determined by the amount or lack of fines in the water being separated. When the quantity or size or both quantity and size of the fines is tolerable, the screen speed can be considered set at an acceptable rate. The slowly advancing screens reduce and minimize shear forces between the top surface of the perforated screens 202 and 208 and the fish flesh in contact with the top surface of the perforated screens 202 and 208.

In some embodiments of the screen separators, the water 218 and 220 is allowed to separate from the fish flesh 204 and 210 generally only by the force of gravity. That is, there is no artificially induced centrifugal force, such as in a rotating perforated drum or a decanter centrifuge. Further, the force of gravity, while influencing the removal of free water from the fish flesh, does not appreciably cause shear forces between the top surface of the screens and the minced fish flesh resting on the screen. This is unlike some static screens that are shaped in the form of a parabola that have initially a steep decline. In some embodiments of the screens for use in the methods disclosed herein, the screens are generally planar or flat, and the screens have no appreciable incline or decline that would cause sliding movement of the fish flesh on the top surface of the screen leading to undesirable shear forces. In some embodiments, the screens may have a decline or incline; however, the decline or incline is not greater than an angle of repose that would cause sliding movement of the fish flesh with respect to the top surface of the screen. The inclination allows the water to pool at the lower side and provides another method of determining when to advance the screen from a stopped position based on the level of pooled water.

In some embodiments, the water 218 that is separated from the fish flesh 204 from the upper perforated screen 202 is deposited onto the lower perforated screen 208. As with the upper screen 202, the lower screen 208 can be either stopped or advancing slowly or fast while the fish flesh mixture is deposited so as to generally keep the speed of the fish flesh mixture at the interface with the screen at about the same speed as the screen 208 to reduce or eliminate shear forces. Because, the water 218 from the upper screen 202 can still carry some amount of desirable proteins, a second screen separator can be used in some cases. The conveyor 216 then moves the washed fish flesh from the second screen separator 208 to the next step, such as the refining step, block 110. The wash water separate step described herein can replace other wash water separate steps in many surimi manufacturing processes.

Design criteria that can affect the performance of the screen separator 200 to remove the wash water include, for example, the length of the separator screens, the speed of the screens, or amount of material processed per unit time.

The washing and water separation process reduces the water soluble sarcoplasmic protein and concentrates the myofibrillar protein. It is the myofibrillar protein that gives surimi its characteristic gel-forming properties. Therefore, an efficient wash step without the loss of myofibrillar protein is highly desirable.

As with other steps, the variations in the temperature and amount of wash water may vary based on the quality of the surimi desired and the tolerance for the loss of myofibrillar protein and water usage. However, the use of a water separator that produces low to no shear force between the perforated screen and the fish flesh leads to reducing the loss of myofibrillar protein in most or all variations of washing.

Other embodiments of a low or no shear force water separator are also contemplated. For example, while a separator screen may be stationary with respect to horizontal movement, the screen may vibrate in an up and down direction. A perforated screen that vibrates in the up and down direction produces little to no shear force between the surface of the perforated screen and the fish flesh. Instead, the forces are more likely to be compression and tension. It is also appreciated that a vibrating perforated screen moving solely in the up and down direction may further create artificial forces driving the water out of the fish flesh. Therefore, in some embodiments, the wash water separates by the force of gravity supplemented with an artificially created force to drive the water out of the fish flesh.

Referring to FIG. 1, after the separate step, the fish flesh may be refined according to well-known methods. The refining machinery can further reduce the impurities such as skin, bone, and connective tissues. Following refining, a dewatering step may be conducted. The dewatering step, block 112, may be performed by a conventional screw press or a conventional decanter centrifuge. However, in some embodiments disclosed herein, the water that is separated in the dewatering step, block 112, may be introduced into the separate step, block 108. The water collected from the dewatering apparatus may be added along with the wash water at block 106 or may be added at the separate step, block 108. If added with the fresh wash water, the combined water is used in the wash step, block 106. If added to the separate step, block 108, the water may simply be deposited along with or on top of the fish flesh 204 on the upper screen 202, as illustrated in FIG. 2. From the dewater step, block 112, the fish flesh may optionally be blended with cryoprotectants, block 114. Known cryoprotectants include sorbitol, sucrose, and phosphates. Cryoprotectants prevent the denaturation of the myofibrillar proteins when frozen. After blending with cryoprotectants in block 114, the fish flesh may be frozen in block 116.

Figure 3:
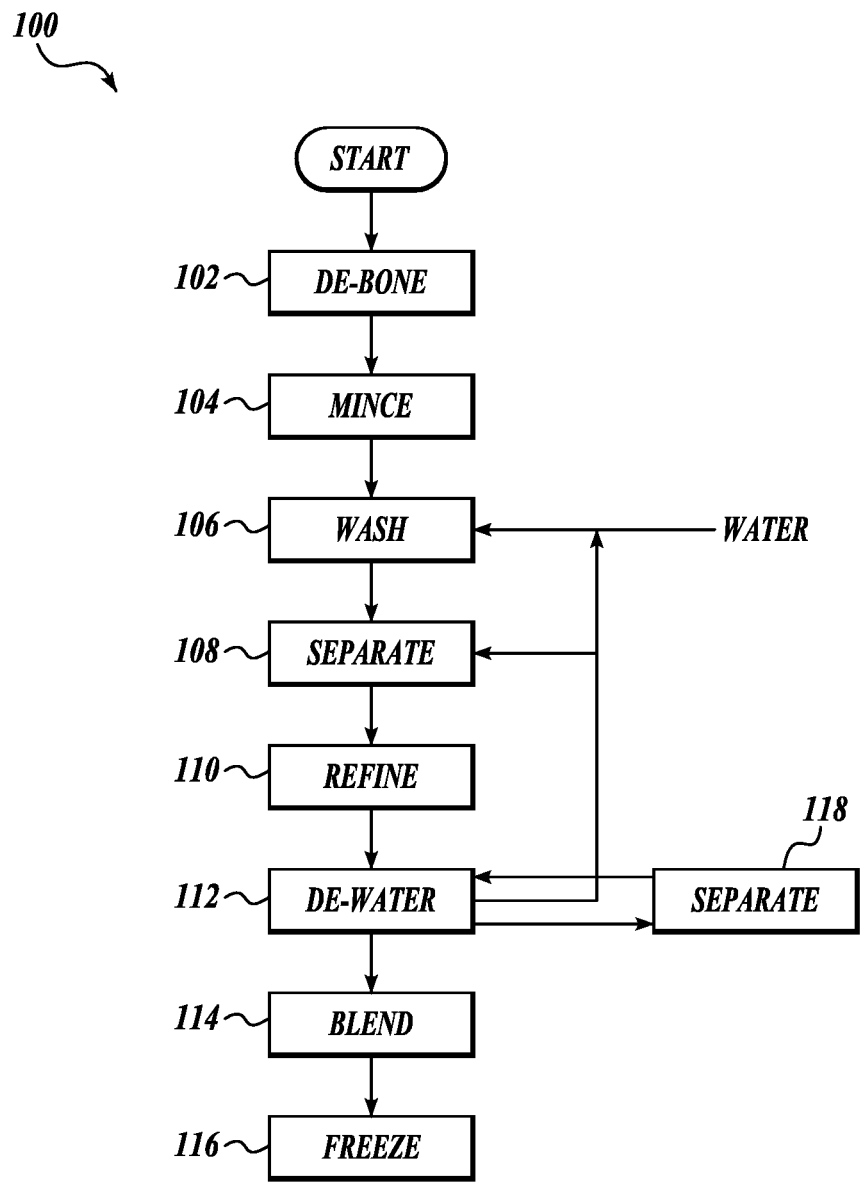
FIG. 3 is a generalized process of producing surimi in accordance with embodiments of the invention.

Referring to FIG. 3, another embodiment of a process of producing surimi is illustrated. The process of FIG. 3 includes the same steps described in association with FIG. 1. However, FIG. 3 additionally shows a process modification where fish flesh that may be present with the water separated in the dewater step in block 112 is recovered in a second separate step in block 118. Water with any fish flesh solids separated in the dewater block 112 is fed to the second separate block 118. The separate block 118 uses the same separators as described in association with the separate block 108 of FIG. 1. That is, the separate block 118 may use one or more of the separators described in association with FIG. 2. After the second separate block 118, the solids recovered in the equipment may be returned to the dewater block 112 for inclusion with the other fish flesh, while the liquid separated in the separate block 118 may be discarded or processed in any manner.

Any processes described herein may be performed on any fish flesh or a combination of fish flesh from more than one species of fish. Some commercially valuable fish flesh includes, but is not limited to, the fish flesh of Alaska Pollock (*Theragra chalcogramma*), Pacific whiting (*Merluccius productus*), Atlantic cod (*Gadus morhua*), Pacific cod (*Gadus macrocephalus*), Croaker (*Pennahia macrocephalus*), Bigeye (*Priacanthus arenatus*), Tilapia (*Oreochromis mossambicus*), Southern Blue whiting (*Micromesistius australis*), Blue whiting (*Micromesistius poutassou*), Basa (*Pangasius bocourti*), Carp (*Cyprinidae* spp.), Hake or Cod (*Gadidae* spp.), Catfishes (order Siluriformes), Atlantic salmon (*Salmo salar*), Chinook salmon (*Oncorhynchus tshawytscha*), Chum salmon (*Oncorhynchus keta*), Coho salmon (*Oncorhynchus kisutch*), Pink salmon (*Oncorhynchus gorbuscha*), Sockeye salmon (*Oncorhynchus nerka*), any member of the Cyprinidae large family of freshwater fishes, including the carps.

EXAMPLES

Comparative Example of Myofibrillar Protein Recovery Based on Literature

Loss of myofibrillar protein during surimi production is discussed in the food science literature. "(in) a typical surimi process only 50-60% of the myofibrillar proteins are retained through the washing and dewatering process" (Mireles Dewitt, C., Lin, J., & Ismond, A. (2014), "Waste Management, Utilization, and Challenges," in *Surimi and Surimi Seafood* (3rd ed., p. 322), Boca Raton: CRC Press Taylor & Francis Group.)

In order to calculate the wash losses alone requires an estimate of screw press protein recovery. Park et al. provide a total mass recovery in the screw press of 50%. Lin, J. W. Park, and Morrissey provide the protein content in press water of 0.89%. (Lin, J. W. Park, J., & Morrissey, M. (1995), "Recovered Protein and Reconditioned Water From Surimi Processing Waste," *Journal of Food Science*, 60(1), 4-9.)

If 100 kg of press-feed at 9% protein (90 kg) enters the press and a total of 500 kg is discharged as waste, with a protein content of 0.89% yielding a loss of 4.45 kgs, the press recovery is calculated as follows: (90 kg–4.55 kg)/90 kg=94.9%. Applying this correction factor by dividing the 50-60% reported by Dewitt et al. leads to an estimate of wash recovery as a range bounded by 52.7% and 63.2%, or wash losses of myofibrillar protein of between 36.8 and 47.3%.

Comparative Example of Myofibrillar Protein Recovery Based on Factory Production During the period Jul. 2-Jul. 31, 2013, Trident's Akutan factory collected daily samples of the effluent and measurements of the flow from all surimi screening operations. The samples were analyzed at the factory using an InsiteIG® 3150 suspended solids meter. Duplicate samples were sent to an outside lab for suspended solids measurement.

During this period 4,678 t of surimi was produced. Trident surimi has been tested to contain 15.8% protein; the sarcoplasmic fraction was measured at 3.66% of the total protein. By substitution, the surimi produced therefore contained 712 t of myofibrillar protein. An average of the in-house and outside analysis of the effluent showed that 465 t of insoluble (myofibrillar) protein were discharged from the screens during the period. An estimate of the washing/screening/final dewatering recovery can be made by dividing the amount of myofibrillar protein in the surimi, by the sum of the recovered protein plus the discharges. This calculation yields a wash/screen/final dewatering recovery of 60.5%, or loss of 39.5% of the incoming myofibrillar protein. In the Trident Akutan plant, 79.5% of surimi is dewatered in a decanter rather than a press. Decanter myofibrillar recovery has been internally measured at 83.4%. Using a weighted average of this, along with the 94.9% press recovery shown above, yields an average dewatering recovery of 85.6%, which translates to an estimated wash/screen recovery of 70.6%, or losses of 29.4%.

Invention Example of Trial Myofibrillar Protein Recovery at Trident Kodiak Plant Pin bone-in Alaska Pollock fillets were minced with a Baader® 695, equipped with a 5 mm drum to produce a total of 283.7 kg of mince. This mince was mixed with 1379 liters of water (1+4) mixture. An additional 40.5 liters of water entered the system via the spray bars on the screening device. This mixture was agitated gently for four minutes then pumped through a Crepaco #6 single lobe positive displacement pump at 254 liters per minute and into the inlet of a Dantech A5+A5B double filtering system with a belt with 0.6 mm square holes operating in series with a belt equipped with 0.3 mm holes. The speed was adjusted to accommodate the flow of the slurry and the target moisture content of the cake. The water passing through the screens was sampled periodically during the test. These were immediately analyzed with an InsiteIG® 3150 suspended solids meter. The accumulated solids were collected, sampled and analyzed for moisture and total solids using standard methods.

It is possible to construct a composition based mass balance with the information gathered during the test, along with the composition of the feed.

When treating this as a two phase separation, where one phase includes the water and dissolved protein, and the other includes insolubles, such as bones and stroma (connective tissue) that cannot pass through the screen and myofibrillar protein that passes through the screens to some degree, it is possible, with the sampling done, to determine the mass ratio between the retentate (screen cake) and the permeate effluent.

This calculation shows that the total effluent represents 73.03% of the total mass of the feed and the screen cake represents 26.97% of the feed. This is the only ratio between effluent and cake that is consistent with both the feed composition and the compositions of the effluent and cake.

TABLE 1

Kodiak trial mass balance (kgs)

| | Feed | Effluent | Cake | Total | Recovery |
|---|---|---|---|---|---|
| Myofibrillar | 35.5 | 0.09 | 35.4 | 35.5 | 99.75% |
| Sarcoplasmic | 5.65 | 4.22 | 1.44 | 5.65 | 25.41% |
| Stroma | 8.50 | 0.00 | 8.50 | 8.50 | 100.00% |
| Water (1) | 1409 | 1051 | 358 | 1409 | 25.41% |
| Total | 1459 | 1057 | 404 | 1459 | |

The gross proximate analysis (total moisture, protein, fat, and ash) was performed in 2013 by EXOVA labs (moisture: 81.4%, Fat: 0.6%, Protein 16.5%, Ash: 1.5%). The 2.1% of fat and ash were assumed to have traveled into the screen cake (retentate). The detailed protein composition (myofibrillar, sarcoplasmic, and stroma) was derived from literature compositions. (Park, J., Graves, D., Draves, R., & Yongsawatdigul, J. (2014), "Manufacture of Surimi: Harvest to Frozen Block," in *Surimi and Surimi Seafood* (3rd ed., p. 108), Boca Raton: CRC Press Taylor & Francis Group. Park, J. (Director), (2014, Apr. 23). (Table 4.1, p 108, *Surimi and Surimi Seafood: Protein Composition of Fish and Animal Meats*. The protein composition of Alaska Pollock is well documented; its relative, the Pacific cod (another gadoid), was used as reference in Table 4.1. In Table 4.1, the figures for stroma and myofibrillar protein were transposed: the stroma is 3% and the myofibrillar is 76%. This transposition was disclosed by Dr. J. Park at a lecture conducted at Oregon State University, Astoria, 2014.)

TABLE 2

Summary of mean wash system myofibrillar protein recovery

| | Myofibrillar recovery (%) | Losses (%) |
|---|---|---|
| Literature | 57.95 | 42.05 |
| Akutan Operational | 70.6 | 29.4 |
| Kodiak Trial | 99.76 | 0.25 |

The screening system used in this trial showed an increased recovery of between 41.3% to 72% compared to the examples from literature and an operational factory.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for washing minced fish flesh to remove water soluble sarcoplasmic proteins and reducing the loss of myofibrillar proteins from the minced fish flesh, comprising:
   mincing fish flesh by passing the fish flesh through perforations to produce minced fish flesh;
   producing a mixture by combining wash water with the minced fish flesh having sarcoplasmic and myofibrillar proteins, wherein the wash water removes some of the sarcoplasmic proteins from the minced fish flesh;
   depositing the mixture on a screen separator, which is configured to advance forward and remain stationary depending on one or more sensors, time, or a combination;
   separating wash water having sarcoplasmic proteins from the mixture while a speed of the screen separator and a speed of the mixture at the interface with the screen separator remain about equal, which reduces or eliminates shear forces at the interface between the screen separator and the minced fish flesh and results in an increase in a percentage of myofibrillar protein retained in the minced fish flesh.

2. The method of claim 1, wherein the percentage of myofibrillar protein retained is at least 80% by weight of a natural myofibrillar protein in the minced fish flesh.

3. The method of claim 1, wherein a majority of the wash water is separated during a period when the speed of the screen separator and the speed of the mixture at the interface with the screen separator is about equal.

4. The method of claim 1, further comprising maintaining the screen separator in a stationary position while the mixture is being deposited thereon.

5. The method of claim 4, further comprising advancing the screen separator from the stationary position when a weight of the mixture on the screen separator reaches a target.

6. The method of claim 4, further comprising advancing the screen separator from the stationary position when an elapsed time reaches a target.

7. The method of claim 4, further comprising advancing the screen separator from the stationary position when a water content of the mixture reaches a target.

8. The method of claim 4, further comprising advancing the screen separator from the stationary position when a level of pooled water reaches a target.

9. The method of claim 4, wherein the screen separator speed is zero in the horizontal direction in the stationary position.

10. The method of claim 1, further comprising advancing the screen separator while the mixture is being deposited thereon.

11. The method of claim 1, further comprising separating the wash water having sarcoplasmic protein from the minced fish flesh via the force of gravity alone.

12. The method of claim 1, further comprising allowing water from the mixture to pass through the screen separator onto a second screen separator.

13. The method of claim 1, wherein the screen separator comprises a belt screen.

14. The method of claim 1, further comprising refining the washed minced fish flesh to reduce impurities and connective tissue, followed by dewatering the minced fish flesh and collecting resulting water, and adding the water from the dewatering step to the mixture before or during depositing the mixture onto the screen separator.

15. The method of claim 1, further comprising refining the washed minced fish flesh to reduce impurities and connective tissue, followed by dewatering the minced fish flesh and collecting resulting water with solids, and separating the resulting water and solids on a screen separator, which reduces or eliminates shear forces at the interface between the screen and the solids by having a speed of the screen separator and a speed of the mixture at the interface with the screen separator remain about equal.

16. The method of claim 1, further comprising advancing the screen at an effective rate by having the speed of the screen separator and the speed of the mixture at the interface with the screen separator remain about equal that reduces or eliminates shear force between the interface of the screen separator and the minced fish flesh.

17. The method of claim 1, wherein the minced fish flesh is Alaska Pollock (*Theragra chalcogramma*), Pacific whiting (*Merluccius productus*), Atlantic cod (*Gadus morhua*), Pacific cod (*Gadus macrocephalus*), Croaker (*Pennahia macrocephalus*), Bigeye (*Priacanthus arenatus*), Tilapia (*Oreochromis mossambicus*), Southern Blue whiting (*Micromesistius australis*), Blue whiting (*Micromesistius poutassou*), Basa (*Pangasius bocourti*), Carp (Cyprinidae spp.), Hake or Cod (*Gadidae* spp.), Catfishes (order Siluriformes), Atlantic salmon (*Salmo salar*), Chinook salmon (*Oncorhynchus tshawytscha*), Chum salmon (*Oncorhynchus keta*), Coho salmon (*Oncorhynchus kisutch*), Pink salmon (*Oncorhynchus gorbuscha*), Sockeye salmon (*Oncorhynchus nerka*), any member of the Cyprinidae large family of freshwater fishes, including the carps.

18. A method for producing surimi, comprising washing minced fish flesh according to claim 1.

* * * * *